(12) United States Patent
Boothby et al.

(10) Patent No.: US 6,330,568 B1
(45) Date of Patent: Dec. 11, 2001

(54) SYNCHRONIZATION OF DATABASES

(75) Inventors: David J. Boothby; Robert C. Daley; John R. Marien, all of Nashua, NH (US)

(73) Assignee: Pumatech, Inc., San Jose, CA (US)

( * ) Notice: Subject to any disclaimer, the term of this patent is extended or adjusted under 35 U.S.C. 154(b) by 0 days.

(21) Appl. No.: 08/964,751

(22) Filed: Nov. 5, 1997

Related U.S. Application Data

(63) Continuation-in-part of application No. 08/749,926, filed on Nov. 13, 1996, now abandoned.

(51) Int. Cl.[7] .................................................... G06F 17/00
(52) U.S. Cl. ......................... 707/201; 707/200; 707/202; 707/203
(58) Field of Search ........................................ 707/1–206

(56) References Cited

U.S. PATENT DOCUMENTS

| | | | |
|---|---|---|---|
| 4,432,057 | 2/1984 | Daniell et al. | 395/608 |
| 4,807,182 | 2/1989 | Queen | 395/144 |
| 4,819,156 | 4/1989 | DeLorme et al. | 395/182.13 |
| 4,827,423 | 5/1989 | Beasley et al. | 364/468 |
| 4,866,611 | 9/1989 | Cree et al. | 395/600 |
| 4,875,159 | 10/1989 | Cary et al. | 395/619 |
| 4,956,809 | 9/1990 | George et al. | 395/601 |
| 4,980,844 | 12/1990 | Demjanenko et al. | 364/550 |
| 5,065,360 | 11/1991 | Kelly | 395/800 |
| 5,136,707 | 8/1992 | Block et al. | 395/600 |
| 5,142,619 | 8/1992 | Webster, III | 395/161 |
| 5,155,850 | 10/1992 | Janis et al. | 395/600 |
| 5,170,480 | 12/1992 | Mohan et al. | 395/600 |
| 5,187,787 | 2/1993 | Skeen et al. | 395/600 |
| 5,210,868 | 5/1993 | Shimada et al. | 395/615 |
| 5,228,116 | 7/1993 | Harris et al. | 395/54 |

(List continued on next page.)

OTHER PUBLICATIONS

USSN 08/927922, filed Sep. 11, 1997.
USSN 08/752,490, filed Nov. 13, 1996.
USSN 08/749,926, filed Nov. 13, 1996.
USSN 08/748,645, filed Nov. 13, 1996.
Chapura, Inc., *3 Compare*, http://www.chapura.com/3compare.html (1997).
Chapura, Inc., *PilotMirror Features Page*, http://www.chapura.com/features.html (1997).
User Manual for Connectivity Pack for the HP 95LX, Hewlett Packard Company (1991).
User Manual for PC-Link for the B.O.S.S. and the PC-Link for the B.O.S.S., Traveling Software, Inc. (1989).
Zahn et al., *Network Computing Architecture*, pp. 1–11; 19–31; 87=115; 117–133; 187–199; 201–209 (1990).
"FRx Extends Reporting Power of Platinum Series: (IBM Desktop Software's Line of Accounting Software)," Doug Dayton, PC Week, v. 8, n. 5, p. 29(2) (Feb. 4, 1991).
IntelliLink Brochure (1990).

(List continued on next page.)

*Primary Examiner*—Thomas Black
*Assistant Examiner*—David Yink Jung
(74) *Attorney, Agent, or Firm*—Fish & Richardson P.C.

(57) ABSTRACT

A computer implemented method and a computer program for synchronizing a first and a second database, where data is provided for keeping track of whether the records of the first database have been added or changed since a previous synchronization. Based data reflecting whether the records of the first database have been added or changed since a previous synchronization, it is determined whether the records of the first database have been changed or added since the previous synchronization. If one of the records of the first database has not been changed or added since the previous synchronization, a synchronization with records of the second database is performed using a record representative of the one record at the time of a previous synchronization. The representative record is stored in a history file which contains records reflecting the contents of records of the databases at the time of a previous synchronization.

10 Claims, 11 Drawing Sheets

U.S. PATENT DOCUMENTS

| | | | |
|---|---|---|---|
| 5,237,678 | 8/1993 | Kuechler et al. | 395/600 |
| 5,251,151 | 10/1993 | Demjanenko et al. | 364/550 |
| 5,251,291 | 10/1993 | Malcolm | 395/161 |
| 5,261,045 | 11/1993 | Scully et al. | 395/161 |
| 5,261,094 | 11/1993 | Everson et al. | 395/617 |
| 5,272,628 | 12/1993 | Koss | 364/419.19 |
| 5,278,978 | 1/1994 | Demers et al. | 395/600 |
| 5,278,982 | 1/1994 | Daniels et al. | 395/600 |
| 5,283,887 | 2/1994 | Zachery | 395/500 |
| 5,293,627 | 3/1994 | Kato et al. | 395/550 |
| 5,301,313 | 4/1994 | Terada et al. | 395/600 |
| 5,315,709 | 5/1994 | Alston, Jr. et al. | 395/606 |
| 5,327,555 | 7/1994 | Anderson | 395/617 |
| 5,333,252 | 7/1994 | Brewer, III et al. | 395/767 |
| 5,333,265 | 7/1994 | Orimo et al. | 395/200 |
| 5,333,316 | 7/1994 | Champagne et al. | 395/600 |
| 5,339,392 | 8/1994 | Risberg et al. | 395/161 |
| 5,339,434 | 8/1994 | Rusis | 395/700 |
| 5,355,476 | 10/1994 | Fukumura | 395/600 |
| 5,375,234 | 12/1994 | Davidson et al. | 395/600 |
| 5,392,390 | 2/1995 | Crozier | 395/335 |
| 5,396,612 | 3/1995 | Huh et al. | 395/575 |
| 5,434,994 | 7/1995 | Shaheen et al. | 395/617 |
| 5,444,851 | 8/1995 | Woest | 395/200.1 |
| 5,463,735 | 10/1995 | Pascucci et al. | 395/200.1 |
| 5,475,833 | 12/1995 | Dauerer et al. | 395/617 |
| 5,511,188 | 4/1996 | Pascucci et al. | 395/600 |
| 5,519,606 | 5/1996 | Frid-Nielsen et al. | 395/228 |
| 5,560,005 | 9/1996 | Hoover et al. | 395/600 |
| 5,568,402 | 10/1996 | Gray et al. | 364/514 C |
| 5,583,793 | 12/1996 | Gray et al. | 364/514 C |
| 5,596,574 | 1/1997 | Perlman et al. | 370/389 |
| 5,600,834 | 2/1997 | Howard | 395/617 |
| 5,613,113 | 3/1997 | Goldring | 395/618 |
| 5,615,364 | 3/1997 | Marks | 395/618 |
| 5,619,689 | 4/1997 | Kelly | 395/617 |
| 5,630,081 | 5/1997 | Rybicki et al. | 395/948 |
| 5,666,530 | 9/1997 | Clark et al. | 395/617 |
| 5,666,553 | 9/1997 | Crozier | 395/803 |
| 5,682,524 | 10/1997 | Freund et al. | 395/605 |
| 5,684,984 | 11/1997 | Jones et al. | 395/610 |
| 5,684,990 | 11/1997 | Boothby | 395/619 |
| 5,701,423 | 12/1997 | Crozier | 395/335 |
| 5,708,812 | 1/1998 | Van Dyke et al. | 395/712 |
| 5,708,840 | 1/1998 | Kikinis et al. | 395/800 |
| 5,710,922 | 1/1998 | Alley et al. | 395/617 |
| 5,727,202 | 3/1998 | Kucala | 395/610 |
| 5,729,735 | 3/1998 | Meyering | 395/610 |
| 5,745,712 | 4/1998 | Turpin et al. | 395/333 |
| 5,758,083 | 5/1998 | Singh et al. | 709/223 |
| 5,758,150 | 5/1998 | Bell et al. | 395/610 |
| 5,758,355 | 5/1998 | Buchanan | 707/201 |
| 5,778,388 | 7/1998 | Kawamura et al. | 707/203 |
| 5,790,789 | 8/1998 | Suarez | 395/200.32 |
| 5,832,489 | 11/1998 | Kucala | 707/10 |
| 5,838,923 | 11/1998 | Lee et al. | 709/235 |
| 5,845,293 | 12/1998 | Veghte et al. | 707/202 |
| 5,870,759 | 2/1999 | Bauer et al. | 707/201 |
| 5,870,765 | 2/1999 | Bauer et al. | 707/203 |
| 5,884,323 | 3/1999 | Hawkins et al. | 707/201 |
| 5,884,324 | 3/1999 | Cheng et al. | 707/201 |
| 5,884,325 | 3/1999 | Bauer et al. | 707/201 |
| 5,897,640 | 4/1999 | Veghte et al. | 707/202 |
| 5,926,824 | 7/1999 | Hashimoto et al. | 707/520 |
| 5,928,329 | 7/1999 | Clark et al. | 709/227 |
| 5,978,813 | 11/1999 | Foltz et al. | 707/201 |
| 5,999,947 | 12/1999 | Zollinger et al. | 707/203 |
| 6,081,806 | 6/2000 | Chang et al. | 707/8 |
| 6,125,369 | 9/2000 | Wu et al. | 707/201 |

OTHER PUBLICATIONS

"Logical Connectivity: Applications, Requirements, Architecture, and Research Agenda," Stuart Madnick & Y. Richard Wang, MIT, Systems Sciences, 1991 Hawaii Int'l, vol. 1, IEEE (Jun. 1991).

"Open Network Computing—Technical Overview," Sun Technical Report, Microsystems, Inc., pp. 1–32 (1987).

Organizer Link II Operation Manual, Sharp Electronics Corporation.

"The Big Picture (Accessing Information on Remote Data Management System," UNIX Review, v. 7, n. 8, p. 38(7) (Aug. 1989).

Alfieri, "The Best of WordPerfect Version 5.0," Hayden Books, pp. 153–165, 429–435 (1988).

"Automatically Synchronized Objects," Research Disclosure #29261, p. 614 (Aug. 1988).

Cobb et al., "Paradox 3.5 Handbook 3rd Edition," Bantam, pp. 803–816 (1991).

Wiederhold et al., Consistency Control of Replicated Data in Federated Databases, IEEE, pp. 130–132 (11/90).

Bowen et al., Achieving Throughput and Functionality in a Common Architecture: The DataCycle Experiment, IEEE, p. 178 (12/91).

Pseudo Code for Translation Engine Control Module

100. CREATE Parameter_Table from User Input A & B database characteristics and default values
101. INSTRUCT Synchronizer to initialize itself
102. INSTRUCT Synchronizer to LOAD the History_File into its WORKSPACE
103. INSTRUCT B_Translator to LOAD all of B_records from B_Database and SEND to Synchronizer (Synchronizer STORES these records in WORKSPACE)
104. INSTRUCT A_Translator to SANITIZE B_records that were just LOADED (A_Translator USES Synchronizer services to read and write records in the WORKSPACE; Synchronizer maps these records using the B→A_Map before sending them to A_Translator and maps them back using A→B_Map before rewritting them into the WORKSPACE)
105. INSTRUCT A_Translator to LOAD all of A_records form A_Database and SEND to Synchronizer (Synchronizes STORES these records in WORKSPACE by first mapping them using the A→B_Map and them storing in their new form)
106. INSTRUCT B_Translator to SANITIZE A_records that were just LOADED (B_Translator uses Synchronizer services to read and write records in the WORKSPACE)
107. INSTRUCT Synchronizer to do CAAR (Conflict Analysis And Resolution) on all the records in WORKSPACE.
108. INFORM user exactly what steps Synchronizer proposes to take (i.e. Adding, Changing, and Deleting records). WAIT for User
109.     IF user inputs NO, THEN ABORT
110. INSTRUCT B_Translator to UNLOAD all applicable records to B_Database.
111. INSTRUCT A_Translator to UNLOAD all applicable records to the A_Database.
112. INSTRUCT Synchronizer to CREATE a new History File.

FIG. 3

1050. Verify History File
1051.     If verified, Then Proceed as Fast Synch
1052.     If not, Then Proceed as Synchronization from Scratch load all record in databasse 1053. If Fast Synch
1054.     LOAD records into the Workspace. Map if necessary
1055.     Sanitize Records not marked as Deletion
1056.     Orientation analysis
1057.     For each H_Record, analyze the CIG that the H_Record belongs to.
1058.         IF the H_Record's CIG contains no Record from the Fast Synchronization database, THEN CLONE the H-Item, label it a Fast Synchronization Record, and add it to the H_Record's CIG.
1059.         If the H_Record's CIG contains a Fast Synchronization record that is marked as a a Deletion, it is now removed from the CIG.
1060.         If the H_Record's CIG contains a non-Delete Fast Synchronization Record, then do nothing.
1061.     END LOOP

FIG. 4

1150. Verify History File
1151.     If verified, Then Proceed as Fast Synch
1152.     If not, Then Proceed as Synchronization from Scratch 1153. IF synchronization from scratch
1154.     IF record outside of current_date_range THEN MARK record as out-of-range 1155. If Fast Synch
1156.     Load History File into Workspace
1157.     MARK History File records outside of previous_date_range as Bystander
1158.     Load All Fast Synchronization Records into the Workspace; mapped if necessary.
1159.     SANITIZE Records which are not DELETEs
1160.     Orientation analysis
1161.     If Added Fast Synchronization record is out of current date range THEN MARK Out-Of_Range
1162.     If Changed or deleted Fast Synchronization record in a CIG with Bystander H_Record, MARK the Bystander record as Garbage
1163.     For each H_Record, analyze the CIG that the H_Record belongs to.
1164.         If the H_Record's CIG contains no Record from the Fast Synchronization database, then make a clone of the H-Item, label it a Fast Synchronization Record, and adding it to the H_Record's CIG.
1165.         If H_Record is not a Bystander, THEN Make a clone of H_Record, mark as Fast

FIG. 5A

1166. Synchronization record, and Add to CIG
1167. IF H_Record is Bystander THEN
1168.     IF outside of Current date range THEN Do Nothing
1169.     ELSE {Within Current Date Range}
        Mark H_Record as Garbage, Clone H_Record and Mark it as from Fast Synchronization database
    END IF
1170. END IF
1171. 
1172. If the H_Record's CIG contains a Fast Synchronization record that is marked as a deletion, it is now removed from the CIG.
1173. If the H_Record's CIG contains a non-deletion Fast Synchronization Record, then do nothing.
1174. Any Fast Synchronization records which are not joined to any H_Record's CIG represent additions and no transformation is required.
1175. END LOOP

FIG. 5B

```
1200   FOR each Record in Database
1201       Get Unique ID
1202       Get Last modified Date/Time
1203           IF Last modified Date/Time Stamp (Less Than or Equal To) Last Sync Date/Time Stamp
1204               Set Flag to indicate "Unchanged" Record
1205           ELSE
1206               Set Flag to indicate "Changed/New" Record
1207               FOR each Field in Record
1208                   Load Field Data into the Workspace
1209               NEXT
1210           ENDIF
1211           Put the loaded record in the workspace
1212   NEXT 1213   In the synchronizer:
1214       Compare the loaded unique IDs with the Unique ID of all records in the history file
1215       Determine as deleted those records whose unique ID of records in the history file but not in loaded records
1216       Compare unique IDs of records marked as changed to unique IDs of the records of the history file.
1217       Determine as Added those records having unique IDs not present in the history file
1218       Proceed as in fast synchronization to synchronize (i.e Fig. 5, from line 1159 onward)
1219       Update the history file as for fast synchronization databases
1220       Unload records as for fast synchronization databases
```

FIG. 6

1250 Query the Database for All Records where Last Modified date/time <= Last Sync Date/Time
1251 FOR each Record in QuerySet
1252     Get Unique ID
1253     Set Flag to indicate "Unchanged" Record
1254     Return record to the Sync Engine
1255 NEXT
1256 Query the Database for All Records where Last Modified date/time > Last Sync Date/Time
1257 FOR each Record in QuerySet
1258     Get Unique ID
1259     Set Flag to indicate "Changed/New" Record
1260     FOR each Field in Record
1261         Load Field Data
1262     NEXT
1263     Put the loaded record in the workspace
1264 NEXT

FIG. 7

1350. For each Record in Database
1351.     Get unique ID
1352.     Get Last modified Date/Time or Dirty bit, as applicable
1353.     If the record has not been changed since the previous synchronization then
1354.         Call Synchronizer's PutUnchangedRecord function with unique ID
1355.         In the Synchronizer: in reponse to the PutUnchangedRecord fucntion call, use unique ID to find matching History file record using unique ID
1356.         Clone History record
1357.     Else
1358.         For each Field in Record
1359.             Load Field Data
1360.         Next Field
1361.         Put loaded record in the workspace.
1362. Next Record.

In the Synchronizer:
1363. Synchronize the two database as if the records were loaded from a regular (i.e. non-fast synchronization database)

FIG. 8

SYNCHRONIZATION OF DATABASES

CROSS REFERENCE TO RELATED APPLICATIONS

This application is a continuation-in-part of a U.S. patent application entitled "Synchronization of Databases with Record Sanitizing and Intelligent Comparison", Ser. No. 08/749,926, filed Nov. 13, 1996, now abandoned.

BACKGROUND

This invention relates to synchronizing incompatible databases.

Databases are collections of data entries which are organized, stored, and manipulated in a manner specified by applications known as database managers (hereinafter also referred to as "Applications"; hereinafter, the term "database" also refers to a database manager combined with a database proper). The manner in which database entries are organized in a database is known as the data structure of a database. There are generally two types of database managers. First are general purpose database managers in which the user determines (usually at the outset, but subject to future revisions) what the data structure is. These Applications often have their own programming language and provide great flexibility to the user. Second are special purpose database managers that are specifically designed to create and manage a database having a preset data structure. Examples of these special purpose database managers are various scheduling, diary, and contact manager Applications for desktop and handheld computers. Database managers organize the information in a database into records, with each record made up of fields. Fields and records of a database may have many different characteristics depending on the database manager's purpose and utility.

Databases can be said to be incompatible with one another when the data structure of one is not the same as the data structure of another, even though some of the content of the records is substantially the same. For example, one database may store names and addresses in the following fields: FIRST_NAME, LAST_NAME, and ADDRESS. Another database may, however, store the same information with the following structure: NAME, STREET_NO., STREET_NAME, CITY_STATE, and ZIP. Although the content of the records is intended to contain the same kind of information, the organization of that information is completely different.

Often users of incompatible databases want to be able to synchronize them with one another. For example, in the context of scheduling and contact manager Applications, a person might use one Application on the desktop computer at work while another on his handheld computer or his laptop computer while away from work. It is desirable for many of these users to be able to synchronize the entries on one with entries on another. The U.S. patent and copending patent application of the assignee hereof, Puma Technology, Inc. of St. Jose, Calif. (U.S. Pat. No. 5,392,390 (hereinafter, "the '390 patent"); U.S. application, Ser. No. 08/371,194, filed on Jan. 11, 1995, incorporated by reference herein) show two methods for synchronizing incompatible databases and solving some of the problems arising from incompatibility of databases.

Synchronization of two incompatible databases often requires comparison of their records so that they can be matched up prior to synchronization. This may require transferring records in one database from one computer to another. However, if the data transfer link between the two computers is slow, as for example is the case with current infrared ports, telephone modem, or small handheld computers, such a transfer increases the required time for synchronization by many folds.

SUMMARY

The invention provides for using certain design characteristics of certain Applications to speed up the synchronization process. Some Applications provide information for keeping track of which records were changed, deleted, or added since the last synchronization. The invention uses these features to speed up the synchronization process by retrieving only those records which have been changed or added since a previous synchronization.

In one general aspect, the invention provides a computer implemented method and a computer program for synchronizing a first and a second database. Based on data reflecting whether the records of the first database have been added or changed since a previous synchronization, it is determined whether the records of the first database have been changed or added since the previous synchronization. If one of the records of the first database has not been changed or added since the previous synchronization, a synchronization with records of the second database is performed using a record representative of the one record at the time of a previous synchronization. The representative record is stored in a history file which contains records reflecting the contents of records of the databases at the time of a previous synchronization.

Preferred embodiments may include one or more of the following features.

The data provided for keeping track of whether the records of the first database have been added or changed since a previous synchronization may be database generated data, stored in the records of the first database.

The computer generated data indicates the most recent date and time of when a record was created or changed. The computer generated data includes a flag set when a record is created or changed.

The first database provides further database generated data indicating which records were deleted since the previous synchronization. Records of the history file corresponding to the deleted records are identified by performing a comparison of the further computer generated data with the history file. Records of the history file corresponding to records of the first database deleted since the previous synchronization are identified by performing a comparison of the records of the history file and a result of determining which of the records of the first database have been added or deleted.

The first database assigns a unique identification data to the records of the first database. A comparison of the records of the history file is made to the unique identification data of records in the first database that have been changed or added since the previous synchronization. The synchronization is completed using a result of the comparison.

Records of the first database and the history file are modified, added, or deleted based on the results of the synchronization. The history file contains records reflecting the contents of records of the databases at the time of the current synchronization.

Embodiments of the invention may include one or more of the following advantages.

Some embodiments of the invention reduce the number of unchanged records that need to be read from the databases in order to synchronize the databases with one another. Typically a majority of the database records are unchanged. Therefore, not reading the unchanged record reduces the time required to synchronize the databases, especially where the data transfer link between the two computers which store the databases is slow.

The invention may be implemented in hardware or software, or a combination of both. Preferably, the technique is implemented in computer programs executing on programmable computers that each include a processor, a storage medium readable by the processor (including volatile and non-volatile memory and/or storage elements), at least one input device, and at least one output device. Program code is applied to data entered using the input device to perform the functions described above and to generate output information. The output information is applied to one or more output devices.

Each program is preferably implemented in a high level procedural or object oriented programming language to communicate with a computer system. However, the programs can be implemented in assembly or machine language, if desired. In any case, the language may be a compiled or interpreted language.

Each such computer program is preferably stored on a storage medium or device (e.g., ROM or magnetic diskette) that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

Other features and advantages of the invention will become apparent from the following description of preferred embodiments, including the drawings, and from the claims.

BRIEF DESCRIPTION OF THE DRAWINGS

FIG. 3 is the pseudocode for the Translation Engine Control Module.

FIG. 4 is the pseudocode for loading records by a fast synchronization Translator.

FIG. 5A and 5B is the pseudocode for loading records by a fast synchronization Translator.

FIG. 6 is the pseudocode for loading records by a medium synchronization Translator and synchronizing by a synchronizer.

FIG. 7 is the pseudocode for loading records by an alternative medium synchronization Translator.

FIG. 8 is the pseudocode for an alternative method of loading records of a medium synchronization database.

DESCRIPTION

Figure 1:
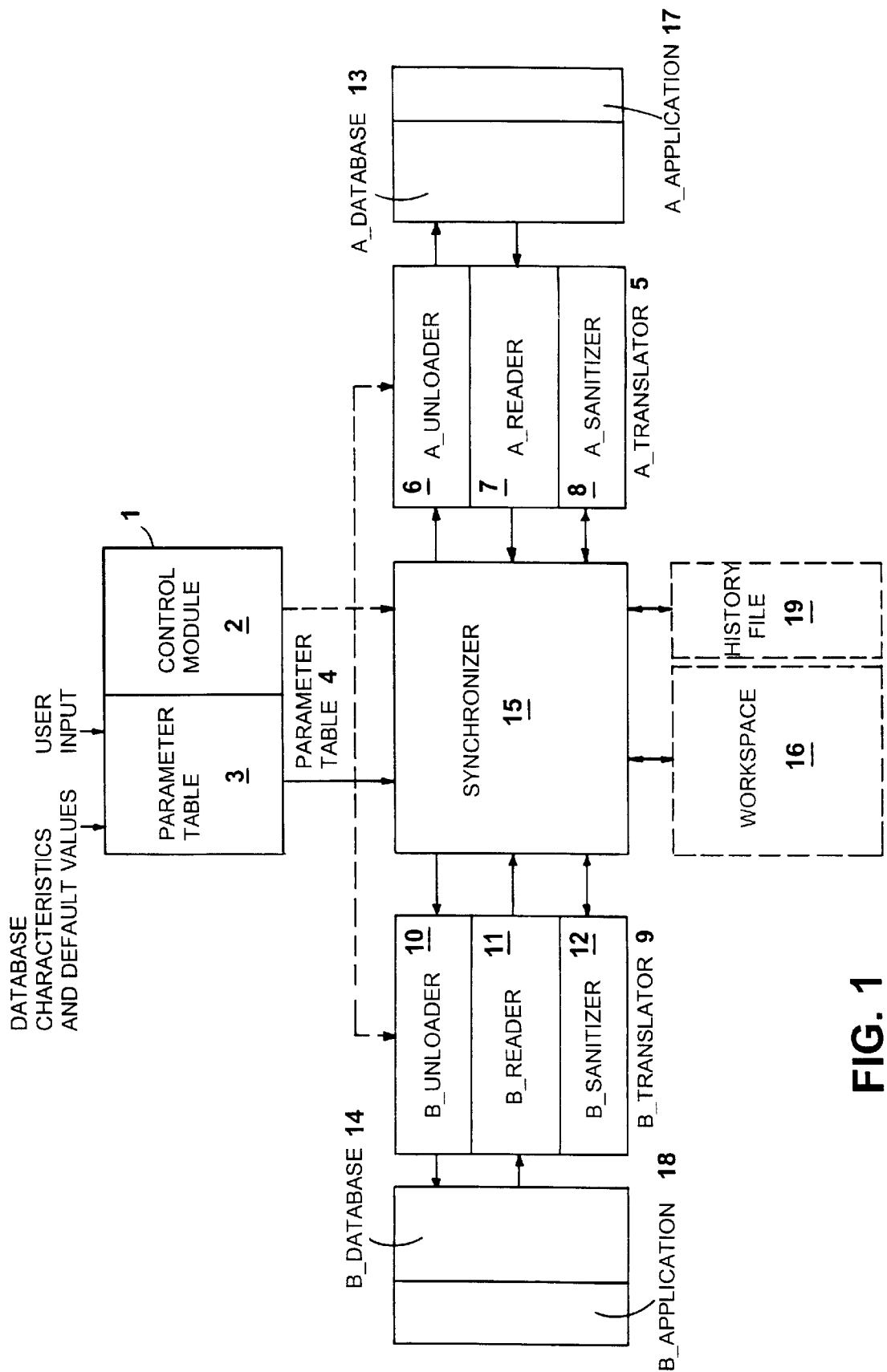
FIG. 1 is a schematic drawing of the various modules constituting the preferred embodiment.

Briefly, a synchronization program 100 (FIG. 1) running on a computer loads records of two databases, e.g. a scheduling database on the computer and another one on a remote handheld or notebook computer. The synchronization program then synchronizes the records of those databases using a history file that contains records representative of the records of the two databases at the end of a previous synchronization. The synchronization program uses the history file to determine, for example, which records have been changed, added or deleted since the previous synchronization and which records of the two databases correspond to one another.

If one of the databases has the capability to provide database generated information or data which can be used to determine, for example, whether a record has been changed, added, or deleted since a previous synchronization, the synchronization program uses that information to determine whether a record has been changed, added, or deleted. Of course, that database generated information is less than the whole record of the database. For example, that information may be a date and time stamp, or a flag, set when the record was last modified or when the record was added, whichever is later.

There are generally two types of such databases: "medium synchronization" and "fast synchronization" databases. A "fast synchronization" database is a database which provides information regarding changes, deletions, and additions to its records from one synchronization to the next. A fast synchronization database also assigns to each record of the database a unique identification code (i.e. a unique ID) which uniquely identifies that record. Unique IDs are required to accurately identify records over a period of time. A fast synchronization database also provides a mechanism for keeping track of which records are added, changed, or deleted from synchronization to synchronization, including a list of deleted records.

A "medium synchronization" database typically has more limited capabilities than a fast synchronization database for keeping track of addition, deletions, or changes. In short, a medium synchronization database does not keep track of deletions. Such a database however still has the capability to provide information regarding what records were added or modified since a previous synchronization. A medium synchronization database also provides unique IDs.

If the information provided by a database indicates that a record has not been changed or added since a previous synchronization, the synchronization program need not load that record and can use the history file to reconstruct the relevant contents of that record for synchronizing the two databases. The history file contains a copy of the relevant content of that record as the record was at the time of (e.g. at the end of) the previous synchronization. Using the history file to reconstruct the record instead of loading the record can result in significant saving of time—where for example the data transfer link between the two computers is slow—since typically a majority of records in databases are unchanged records. The synchronization program thereby increases the efficiency of performing synchronization between two databases.

In order to better understand embodiments the invention described herein, we will briefly describe the overall structure of a synchronization program and the method it uses to synchronize databases, both of which are described in more detail in the following commonly owned U.S. patent applications, incorporated in their entirety by reference, "Synchronization of Recurring Records in Incompatible Databases", Ser. No. 08/752,490, filed on Nov. 13, 1996 (hereinafter, "application '490"); "Synchronization of Databases with Record Sanitizing and Intelligent Comparison," Ser. No. 08/749,926, filed Nov. 13, 1996 (hereinafter, "application '926"); "Synchronization of Databases with Date Range," Ser. No. 08/748,645, filed Nov. 13, 1996 (hereinafter, "application '645"). We will then describe specifically how the synchronization program operates when at least one of the databases provides information indicating that records have been changed, added or deleted since a previous synchronization.

FIG. 1 shows the relationship between the various modules of an embodiment of synchronization program 100. Translation Engine 1 comprises Control Module 2 and Parameters Table Generator 3. Control Module 2 is responsible for controlling the synchronizing process by instructing various modules to perform specific tasks on the records of the two databases being synchronized. (FIG. 3 shows the steps taken by this module.) The Parameters Table Generator 3 is responsible for creating a Parameter_Table 4 which is used by all other modules for synchronizing the databases. Generally, Parameter_Table 4 stores various information which may be used by the modules of the synchronization program. The information stored in Parameter_Table 4 includes user preferences, the names and locations of the databases, and the names and locations of various files stored on disk including the name and location of the history file from the previous synchronization.

Figure 2:
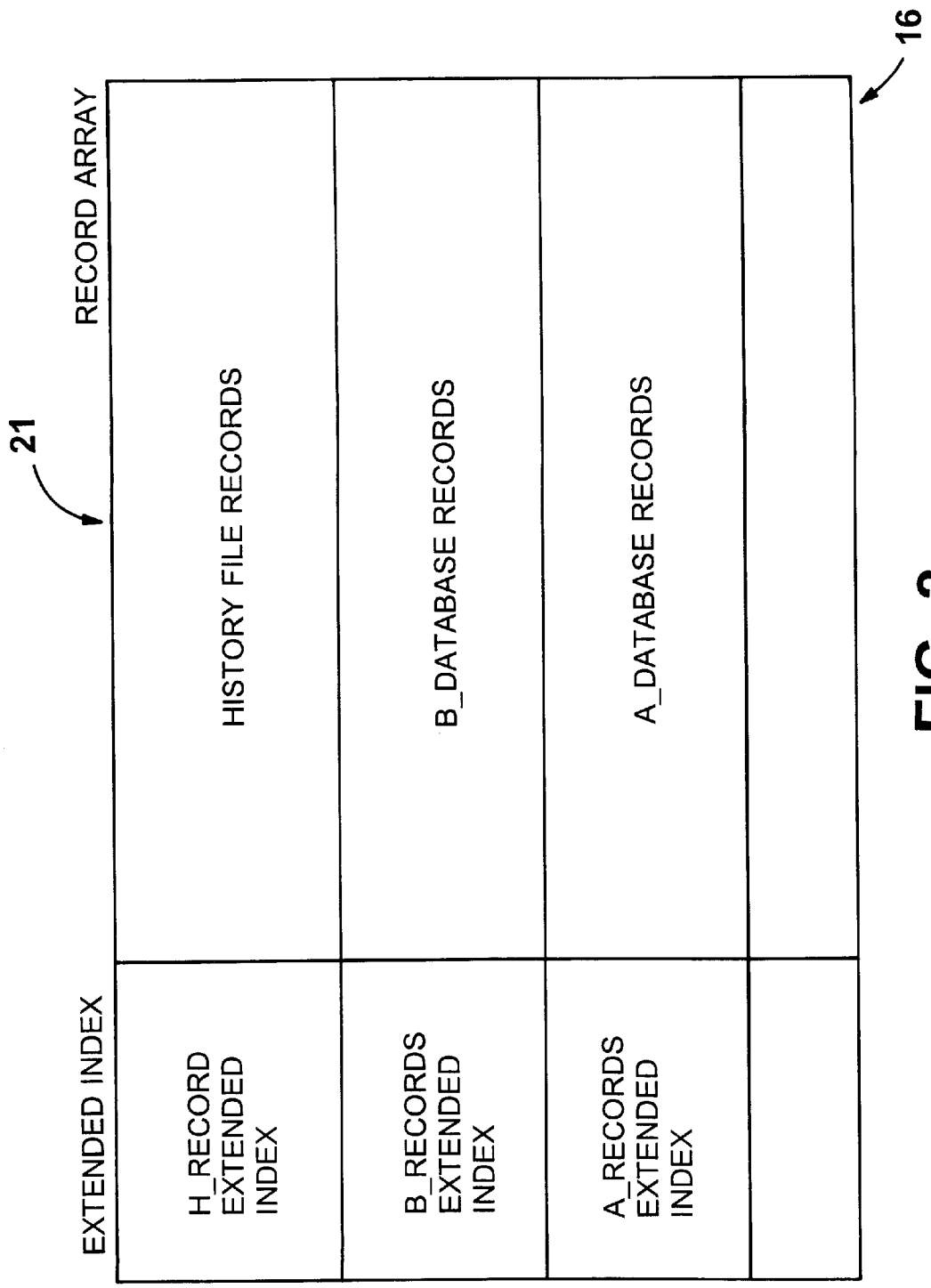
FIG. 2 is a representation of the Workspace data array.

Synchronizer 15 has primary responsibility for carrying out the core synchronizing functions. It is a table-driven code which is capable of synchronizing various types of databases whose characteristics are provided in the Parameter_Table 4. Synchronizer 15 creates and uses the Workspace 16 (also shown in FIG. 2), which is a temporary data array used during the synchronization process.

A Translator 5 (A_Translator) is assigned to the A_database 13 and another Translator 9 (B_Translator) to the B_database 14. Each of the database Translators 5 and 9 comprises three modules: Reader modules 6 and 10 (A_Reader and B_Reader) which read the data from databases 13 and 14; Unloader modules 8 and 12 (A_Unloader and B_Unloader) which analyze and unload records from the Workspace into databases 13 and 14; and Sanitizing modules 7 and 11 (A_Sanitizer and B_Sanitizer) which analyze the records of the opposing database when they are loaded into the Workspace and modify them according to rules of data value of the modules's own database. Briefly stated, rules of data value are generally rules that define the permitted content of the fields of the records of a database. An example of such a rule would be that no more than 100 characters may be present in a field, or that content of a field designating a priority for a "to do" item should be limited to 1, 2, or 3. Sanitizing a record is to change the content of the fields of a record of one database to conform to the rules of data value of another database. Rules of data value and sanitization are described in detail in the '490, '926 and '645 applications.

In the described embodiment, the modules of A_Translator 5 are designed specifically for interacting with A_database 13 and A_Application 17. Their design is specifically based on the record and field structures and the rules of data value imposed on them by the A_Application, the Application Program Interface (API) requirements and limitations of A_Application 17 and other characteristics of A_Database and A_Application. The same is true of the modules of B_Translator 9. These Translators are not able to interact with any other databases or Applications. They are only aware of the characteristics of the database and the Application for which they have been designed. Therefore, in the preferred embodiment, when the user chooses two Applications for synchronization, the Translation Engine chooses the two Translators which are able to interact with those Applications. In an alternate embodiment, the translators can be designed as table-driven codes, where a general Translator is able to interact with a variety of Applications and databases based on supplied parameters.

FIG. 3 is the pseudocode for the described embodiment of Control Module 2 of the Translation Engine 1. We will use this pseudocode to generally describe the steps taken when synchronizing two databases performed by the synchronization program 100. Control Module 2 first instructs the Parameter Table Generator 3 of Translation Engine 1 to create Parameter_Table 4 (Step 100). In step 102, the Translation Engine instructs synchronizer 15 to load the history file. Synchronizer 15 in response creates the Workspace 16 data array and loads history file 19 into Workspace 16. History file 19 is a file that was saved at the end of last synchronization. It contains records representative of the records of the two databases at the end of the previous synchronization. The history file is necessary for use with the current synchronization. Generally, synchronization is a process of analyzing records from the A_Database and B_Database against the records of the history file to determine the changes, additions, and deletions in each of two databases since a previous synchronization and then determining what additions, deletions, or updates need be made to synchronize the records of the two databases. If no history file from a previous synchronization exists or the user chooses to synchronize not using the history file, step 102 is not performed.

Once the history file is loaded into the Workspace, Control Module 2 instructs B_Translator 13 to load the B_Database records (step 103). B_Reader module 11 of the B_Translator reads the B_database records and sends them to synchronizer 15 for writing into the Workspace. Following loading the B_Database records ("B_Records"), A_Sanitizer module 8 of A_Translator 5 sanitizes the B_Records in the Workspace (step 104). Control Module 2 of the Translation Engine 3 then instructs the A_Translator 5 to load the records from the A_Database (step 105). A_Reader module 7 of A_Translator 5 reads the A_Database records ("A_Records") and sends them to synchronizer 15 for writing into the Workspace. B_Sanitizer module 12 of B Translator 9 then sanitizes the A_Records in the Workspace.

Records in the Workspace are stored according to the B_Database data structure. Therefore, as synchronizer 15 receives each A_record from the A_Reader module 7 of the A_Translator 5, synchronizer 15 maps that record using an A→B_Map before writing the record into the next available spot in the Workspace. Since the A_records are mapped into the B_Record format, when the B Sanitizer is instructed by Control Module 2 to begin sanitizing those records and starts asking for them from synchronizer 15, they already have the B_Database format. Therefore, synchronizer 15 does not need to map them before sending them to the B_Sanitizer module 12 of the B_Translator 19. For the same reason, there is no need for them to be mapped once they are sent back by the B_Sanitizer after having been sanitized. However, in the case of B_records, they must be mapped using a B→A map prior to being sent to A_sanitizer and then mapped back using an A→B map. At this point, all records are loaded into the Workspace.

Synchronizer 15 then performs a Conflict Analysis and Resolution ("CAAR") procedure on the records in the Workspace, which procedure is described in detail in the '490, '926 and '645 applications. Briefly, during this process, synchronizer 15 compares the records in the workspace and determines what synchronization actions should be taken. Synchronizer 15 processes the records, including comparing them to one another, in order to form them into groups of related records called corresponding item groups (CIGs). Each CIG may comprise at most one recurring or a group of related nonrecurring records from each of the databases and the history file. After forming CIGs from all records of the two databases, synchronizer 15 compares the records in each CIG with one another, determines their differences, and decides what synchronization action should be taken. Synchronization actions with respect to a record include updating, deleting, adding, or not modifying that record. For example, if after comparing the records in a CIG, synchronizer 15 determines that the record from A_database is unchanged and the one from B_database is changed, synchronizer 15 determines that the A_database record should be changed to conform to the B_database record. Or, if both records are changed (an example of what we refer to as a "conflict" since there is no clear choice of synchronization action), synchronizer 15 may use a user-selected rule to decide what synchronization should be taken. The rule may require, for example, not modifying either of the records, changing the B_database record to conform to the A_database record, or asking the user to resolve conflicts.

When synchronizer 15 finishes performing CAAR on the records, synchronizer 15 would have determined what synchronization action should be taken with respect all records to be synchronized. The records may then be unloaded into their respective databases. The Translators will perform the specific synchronization actions to be taken with respect to the records of the databases. However, prior to doing so, the user is asked to confirm proceeding with unloading (steps 108–109). Up to this point, neither the databases nor the history file have been modified. The user may obtain through the Translation Engine's User Interface various information regarding what synchronization actions will be taken upon unloading.

If the user chooses to proceed with synchronization and to unload, the records are then unloaded. The Unloader modules 6,10 of the Translators 5,9 perform the unloading for the databases. Synchronizer 15 creates the history file and unloads the records into the history file. Control Module 2 of Translation Engine 1 first instructs the B_Translator to unload the records from Workspace into the B_Database. Following unloading of the B_RECORDS, Control Module 2 instructs the A_Translator to unload the A_Records from the Workspace (step 111). This unloading is done in the same way as it was done by the B_Translator. Control Module 2 next instructs synchronizer 15 to create a new history file (step 112). During unloading, the Unloader module of the A_Translator uses the A→B map the map the records in the Workspace into the format of A_database records.

At this point Synchronization is complete.

The speed of the above synchronization process can be improved in the case of databases which provide data for keeping track of which records have been changed, added, deleted, or left unchanged since a previous synchronization. As previously described, there are generally two types of such databases: "medium synchronization" and "fast synchronization" databases.

A "fast synchronization" database is a database which provides information regarding changes, deletions, and additions to its records from one synchronization to the next. Synchronization program 100 can use this information to speed up the synchronization process because records which have not been changed are not loaded from the database. Since the majority of records loaded by regular Translators are typically unchanged records, far fewer records are loaded from the database into Workspace than would otherwise be the case.

Certain features are required for a database to be a fast synchronization database. The database assigns each record of the database a unique ID and provides a mechanism for keeping track of which records are added, changed, or deleted from synchronization to synchronization, including a list of deleted records.

There are at least two ways to keep track of additions, changes, and deletions in a database.

First, some databases maintain one Dirty bit per record which is a boolean flag that is set when a record is created or modified and is cleared when a function for clearing Dirty bits is called. Some databases offer a Clear DirtyBits function that clears a Dirty bits of an individual record. Other databases offer a ClearDirtyBits function that clears the Dirty bits of all records in a database. The record-specific ClearDirtyBit function allows the described embodiment to use the database itself to keep track of additions and changes.

The global ClearDirtyBits function forces the described embodiment to clear all Dirty bits at the conclusion of every Synchronization. Then as database edits are made by the user in between synchronization, the affected records are marked as Dirty. When Synchronization is performed again, only the Dirty records are loaded.

Second, some databases maintain a date and time stamp of when the record was added or last time the record was modified. A Translator for such a database finds all records which were added or modified since the previous synchronization by searching for date and time stamps more recent than the Date&Time of the Last Synchronization.

A fast synchronization database must also keep track of deletions. This is done by maintaining a list of deleted records which can be read by a Translator.

A Translator sending fast synchronization database records to synchronizer 15 provides only records which have been changed, deleted, and added since the previous synchronization. Therefore, unlike a regular database Translator, a fast synchronization database Translator does not provide synchronizer 15 with unchanged records. Moreover, unlike a non-fast synchronization Translator, a fast synchronization translator provides deleted records, which the regular Translators does not.

In order for such databases to be synchronized without resorting to treating them as regular databases (necessitating loading all records), synchronizer 15 transforms fast synchronization database records from the Translator into equivalent regular database records. These transformed records are then used by synchronizer 15 in the synchronization process. There are two transformations which are necessary. First, synchronizer 15 needs to transform deleted records received from the fast synchronization Translator into a regular database deletions. Second, synchronizer 15 needs to transform lack of output by the fast synchronization Translator into unchanged records.

Synchronization program 100 performs these transformations by using the history file. When the databases are synchronized for the first time, all records in the fast synchronization database are loaded into the history file. As changes, additions, and deletions are made to the fast synchronization database, during each of the subsequent synchronization, the same changes, additions, and deletions are made to the history file. Therefore, the history file at the end of each subsequent synchronization contains a copy of the data in the fast synchronization database.

When a fast synchronization database Translator supplies no input for a unique ID history file record, synchronizer 15 finds (i.e. identifies) the corresponding history file record in Workspace 16, copies it into Workspace 16, and treats the copied record as if it were loaded by the fast synchronization translator itself.

Referring to FIG. 4, steps 1050–1051, synchronizer 15 first verifies that there is an appropriate history file. Because synchronization of fast synchronization databases relies heavily on the history file, it is important to ensure that the same history file as the last Synchronization is used. Moreover, the history file is the background against which the transformation of the Translator outputs into regular Translator outputs takes place. The history file keeps a date and time stamp of the previous synchronization. Each of the fast synchronization database (if able to) and the fast synchronization Translator also stores the same date and time stamp. The date and time stamp is used because it is unlikely that another history file will have exactly the same date and time entry, for the same two databases. The date and time stamp also identifies when last the fast synchronization database and the history file contained the same records.

At the start of synchronizing a fast synchronization database with another database, synchronizer 15 and the fast synchronization Translator compare date and time stamps. If the date and time stamp have changed since the previous synchronization, then the synchronization proceeds from scratch (step 1052). In a synchronization from scratch all records of the fast synchronization database are loaded into Workspace 16 and a history file is not used.

In the described embodiment, all records supplied as fast synchronization inputs have a special hidden field called __Delta, which carries a single-letter value—'D' for deleted, 'A' for added, and 'C' for changed. Records are loaded by the fast synchronization Translator into Workspace 16 (step 1054). If necessary, the records are mapped when loaded. Records which are marked as changed or added are sanitized by the Translator for the other database, but deleted records are not because their field values are going to be deleted (step 1055). Orientation analysis, details of which are described in the '490, '926, and '645 applications, is performed on the records. In general terms, during orientation analysis, deletions and changes to fast synchronization database records are joined with their history file counterparts in unique ID bearing CIGs (step 1107). These are CIGs in which at least one of the records is assigned a unique ID. Synchronizer 15 may treat these CIGs differently than other CIGs to improve the efficiency of the synchronization program, for example, by matching them to history file records based on their unique ID value instead of the content of record, as described in detail in applications '490, '926, and '645.

All history file records and their CIGs are now examined. If there is no corresponding record from the fast synchronization database, it means that the record was unchanged. A clone of the record is made, labelled as being from a fast synchronization database, and joined to the history file record's CIG. At this point the deleted fast synchronization database records marked as deleted are removed from CIGs (step 1109). The fast synchronization records marked as changed are joined in doubleton CIGs (i.e. CIGs entry records from two databases). Those marked as additions are singletons. At this point, the synchronization can proceed as if record of a unique ID bearing regular database were just loaded into Workspace 16.

Whenever records are loaded from a fast synchronization database, all records are loaded so that at the end of synchronization the history file will be the same as the fast synchronization database. Therefore, referring to FIG. 5A and 5B, in order to perform date range limited synchronization, synchronizer 15 marks the records which fall outside the current and the previous date ranges. A record marked as an added, or during synchronizing from scratch, a record that falls outside the current date range, it is marked as Out_Of_Range (steps 1101 and 1153–1154). This record will be written into the history file but not into the other database or take part in synchronization. When the fast synchronization database records are loaded from the history file, if they fall outside of the previous date range, they are marked as Bystander (steps 1152–1157). If a Bystander record forms a CIG with a fast synchronization record marked as a deletion or a change, the Bystander is marked with a Garbage flag because its field values serve no useful purpose any more: the record marked as DELETION should be deleted and the record marked as CHANGED should replace the Bystander history file record (step 1162).

History file records for which there are no inputs are transformed in the same manner as before (steps 1164–1165). If a Bystander record falls within the current date range, it is equivalent to a regular database record coming into the current date range. Therefore, the history file record is cloned and marked as a fast synchronization database record while the Bystander record is marked as Garbage (steps 1166–1171). Therefore, just like a new record of a regular database, the record has no history file record counterpart.

If the user selects to abort a synchronization or selects the option to ignore a conflict or conflicts in general, some of the records loaded from the fast synchronization database will not be accepted and recorded in the history file. Therefore, the Translator should provide that record again during the next synchronization. However, because fast synchronization Translators supply only records which have been changed, deleted, or added since the previous synchronization, the records which were not accepted will not be supplied since they remain unchanged. To circumvent this, the fast synchronization Translator waits for an acknowledgement from synchronizer 15 that the record has been accepted.

In the case no such acknowledgement is received for a record, the Translator needs to be able to provide that record again to synchronizer 15. If the database allows resetting individual Dirty bits, the Translator merely does not set that bit. If not, the Translator keeps a separate file in which it keeps a record of which fast synchronization records were not accepted. The file may contain the unique IDs of those records. The Translator then uses that file to provide synchronizer 15 with those records during the next synchronization.

We will now describe synchronization in the case of medium synchronization databases. Medium synchronization databases have more limited capabilities than fast synchronization databases for keeping track of addition, deletions, or changes. Medium synchronization database do not keep track of deletions. They however still have the capability to provide information regarding what records were added or modified since a previous synchronization.

This information typically takes the form of date and time stamps stored with the record or a Dirty bit, as previously described.

In the case of medium synchronization databases, the Translator provides synchronizer 15 with information indicating which records have been added/changed and which records are unchanged. Based on this information and the history file, synchronizer 15 determines which records were deleted. Synchronizer 15 assumes that those records in the history file for which no matching unique ID was obtained from the database are deleted records and flags them as such. In identifying a record as having been deleted from the database, synchronizer 15 can easily determine what synchronization action should be taken with respect to the counterpart of that record in the other database; such action may be to delete the other record. Those records whose unique IDs do not match the unique IDs of the history file records are new records and synchronizer 15 marks them specifically as "added" records.

Synchronizing medium synchronization databases, like in the case of fast synchronization databases, relies on the history file. Therefore, the description of the history file and its treatment in the case of fast synchronization databases equally applies to the case of medium synchronization databases.

FIG. 6 shows the pseudocode for the steps taken by a translator for a medium synchronization database that uses a date and time stamp to provide information regarding whether a record has been changed or added since a previous synchronization. For every record in the database, the translator gets the unique ID and the date and time stamp of that record (steps 1200–1202). If the date and time stamp is prior to or at the same time as the date and time of the previous synchronization, translator determines the records to be unchanged (steps 1203–1204). As described in the case of fast synchronization database, each record in the workspace has a hidden field called _Delta, which carries a single-letter value—'D' for deleted, 'A' for added, and 'C' for changed. In the case of medium synchronization, the hidden field can contain four values, 'D' for deleted, 'A' for added, 'C' for changed, and 'U' for unchanged. Therefore, once the translator determines that the record is unchanged, the translator stores an appropriate value to indicate to the synchronizer that the record is unchanged (step 1205). Records that are unchanged need not be loaded. A copy of the relevant data in the record is contained in the history file. Synchronizer 15 replicates the data of the unchanged record using the content of the history file, in the same manner as in the case of fast synchronization databases. By relevant, we mean data in the fields that are synchronized.

If a record is not unchanged, then the record has either been modified and added since the previous synchronization. The translator sets value of the hidden field as 'C' which indicates to synchronizer 15 that the record was either added or changed (step 1206). The translator then loads the changed or added record, from the database, field by field (steps 1207–1209). The translator then loads the record into the workspace (step 1211).

After the translator has loaded all the records in the database, there are in essence two logical lists in workspace 16. One is the list of records identified as changed/added since a previous synchronization. Second is the list of records identified as unchanged since a previous synchronization. Synchronizer 15 compares the unique IDs of the records in these two lists with the unique IDs in the history file (step 1213). (In the case of date range limited synchronization, the whole database would be loaded but only those records which are in the date range will be synchronized, as was the case for fast synchronization databases.) Based on the comparison, synchronizer 15 determines which records in the history file are no longer present in the database. Synchronizer 15 determines that these records have been deleted and sets the hidden field value for these records as 'D' (step 1214). Synchronizer 15 processes these records in the same manner as when synchronizer 15 receives an indication from a fast synchronization database that a records has been deleted. The synchronizer also compares the unique IDs changed records to the unique IDs of the records of the history file (step 1215). The Synchronizer determines that those unique IDs which are not present in the history file belong to newly added records (step 1216). In that case, synchronizer 15 changes the value stored in the hidden filed value to 'A' to indicate that the record was newly added.

At this point the output of the medium synchronization database has been essentially transformed into output of a fast synchronization database. Synchronizer 15 then proceeds to synchronize the records in the same manner as synchronizer 15 does for fast synchronization databases, since the synchronizer has information as to which records have been changed/added, deleted, and unchanged (step 1217).

At the end of synchronization, during unloading, the history file is updated in the same manner as is the case for fast synchronization database, to ensure the history file records reflect the content of all records of the database at the end of synchronization (step 1218). During unloading, as in the case of fast synchronization, the translators wait for acknowledgement from the databases during unloading.

Other embodiments are within the following claims.

For example, FIG. 7 shows the pseudocode for another embodiment in which the medium synchronization database is able to perform answer queries based on specified criterion. An example of such a criterion would be "changed records after Jan. 1, 1997" in response to which the database provides a list of records matching that criterion. The difference between this embodiment and the embodiment described in reference to FIG. 6 is as follows. The Translator, in step 1250, queries records that have date and time stamps that are prior to or at the same time as the date and time of the last synchronization. The Translator determines these records to be unchanged. The Translator also queries the database for records that have date and time stamps that are subsequent to the date and time stamp of the last synchronization. Translator determines these records to be changed or added since the last synchronization. The rest of the processing by the Translator and synchronizer are the same as the embodiment described in reference to FIG. 6.

In the case of those databases that provide Dirty bits instead of date and time stamps, the Translator determines which records have their Dirty bits set. Those that have their Dirty bit set are changed or added records while those that do not have their Dirty bits set are unchanged records. The rest of the processing by the Translator and synchronizer are the same as the embodiment described in reference to FIG. 6.

FIG. 8 shows another embodiment for synchronizing a medium synchronization database. In this case, for each record (step 1350), the translator loads the unique ID and the date and time stamp or Dirty bit, as may be the case. If the record has not been modified or added since the previous synchronization (step 1353), the translator calls a special function (PutUnchangedRecord) of synchronizer 15 and also supplies the unique ID of the unchanged record to the synchronizer (step 1354). In response to the function call, synchronizer 15 searches the history file for the supplied unique ID (step 1355) and clones the matching history file record (step 1356).

If the record has been modified or added since the previous synchronization (step 1357), the record is loaded from the database (step 1358–1360) and loaded into the workspace (step 1361). Synchronization then proceeds as if the records of a regular database (i.e. a database that does not provide information that may be used to keep track of whether records of the database have been changed, added or deleted) are loaded, as described briefly above and in more detail in '490, '926, and '645 applications. The deleted records, in this embodiment, are then determined as the two databases are synchronized.

In the above described embodiments, a database provides database generated data that may be used to keep track of status of the record (e.g. changed, added, modified, deleted). However, it is also possible to provide a program, for example running on a remote computer, that keeps track of the status of the records of a database. That remote program may then provide the synchronization program only those records that have been changed or added and use data less than the full record to identify those records that are unchanged or have been deleted. We will briefly describe an embodiment of such a program, which is described in detail in the commonly assigned copending U.S. patent application, incorporated herein in its entirety by reference, entitled "DISTRIBUTED SYNCHRONIZATION OF DATABASES", filed on Sep. 11, 1997, Ser. No. 08/927,922.

Figure 9:
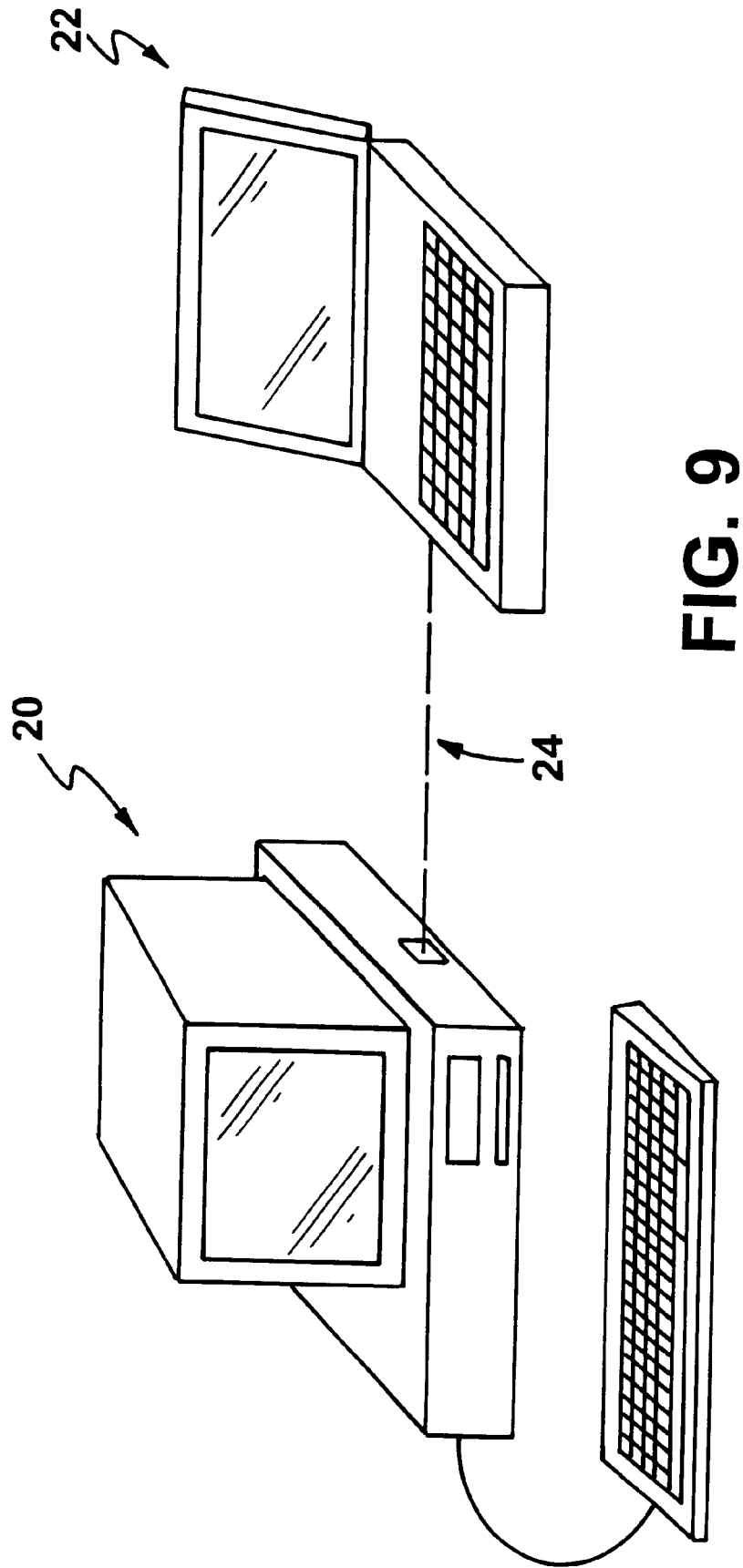
FIG. 9 shows two computers connected via a data transfer link.
Figure 10:
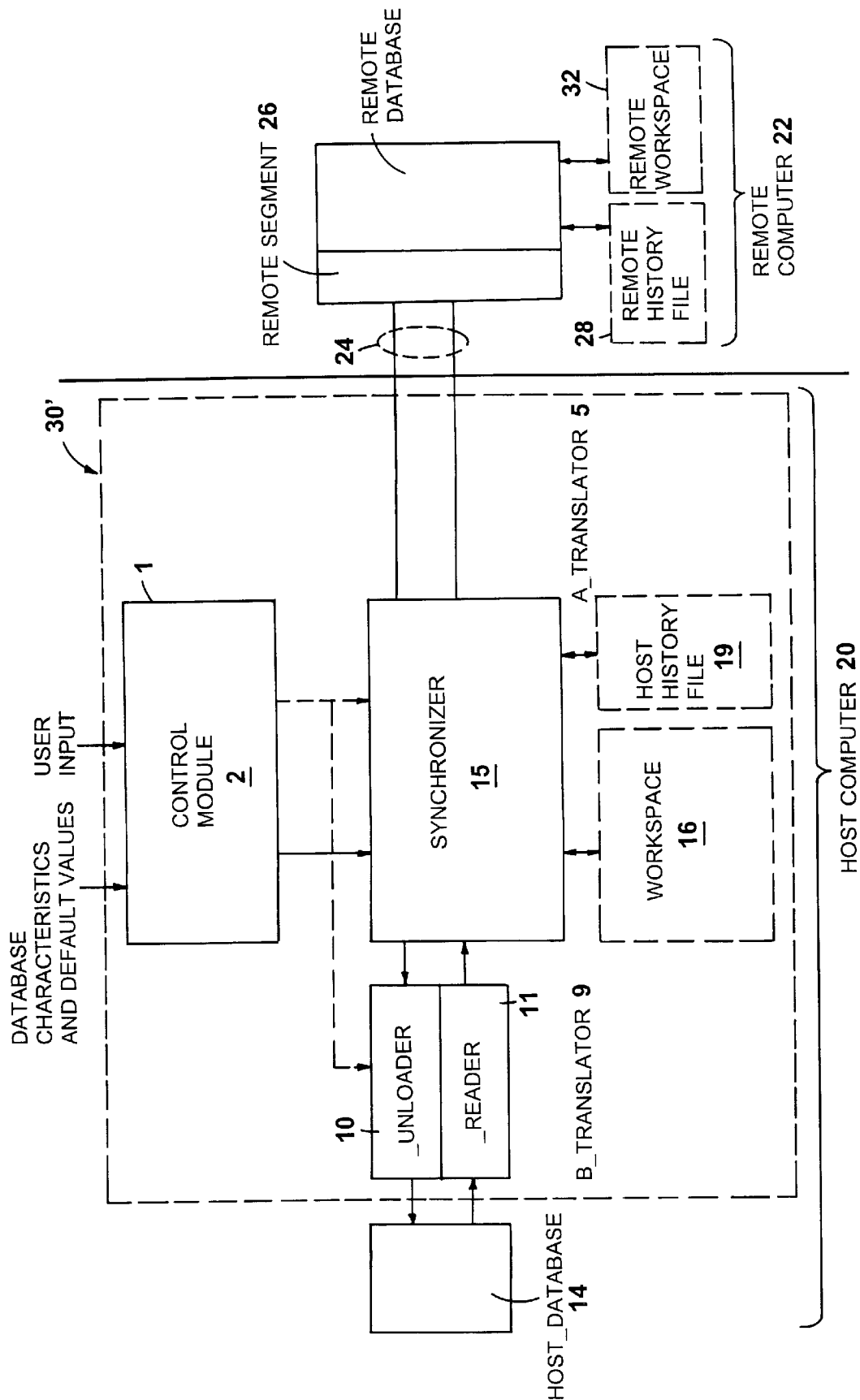
FIG. 10 is a schematic drawing of the various modules constituting an embodiment of a distributed synchronization program.

Briefly, referring to FIGS. 9 and 10, a synchronization program, according to the embodiment described here, has a host segment 28 and a remote segment 26 which run on a host computer 20 and a remote computer 22, respectively. The two computer are connected together via a data transfer link 24 enabling them to transfer data between them. Data transfer link 24 may be a slow data transfer link such as a serial infrared links, serial cables, modems and telephone lines, or other such data transfer links. A host database 13 and a remote database 14, e.g. scheduling databases, are stored on remote computer 22 and host computer 20, respectively.

Generally, in some instances, both computers on which the two databases run are capable of running programs other than a database, as in the case of, for example, general purpose computers such as desktop and notebook computers, or handheld computers having sufficient memory and processing power. In such a case, the synchronization program may be distributed between the two computers so as to, for example, increase the efficiency of using of a slow data transfer link between the two machines.

Briefly, at remote computer 22, remote segment 26 of the synchronization program loads records of remote database 13. Remote segment 26 then determines which records of the remote database have been changed/added or left unchanged since a previous synchronization. If the remote database assigns unique identification codes (i.e. unique ID) to its records, remote segment 26 can further differentiate between records than have been added and those than have been changed since the previous synchronization. Remote segment 26 uses a remote history file 30 which stores data representing or reflecting the records of the database at the completion of the previous synchronization. This data may be a copy of remote database 13. It may also be hash numbers for each of the records of the remote database. If the remote database assigns unique IDs, the remote history file may contain those unique IDs together with the hash numbers of the records corresponding to the stored unique IDs.

Remote segment 26 sends those records of the remote database that have been changed or added to the host segment or the host computer. However, the remote segment does not send the unchanged or deleted records to the host computer. Instead, the remote segment sends a flag indicating the status of the record (e.g. unchanged or changed) and some data or information that uniquely identifies the record to the host segment. This data or information may be a hash number of all or selected fields in the record at the completion of the last synchronization. It may also be the unique ID assigned to the record by the remote database, if the database assigns one to its records.

Host segment 28 uses the received information or data that uniquely identifies the unchanged record to access a record in host history file 19 that corresponds to the received information or data. This record contains a copy of the data of the remote database record that the remote segment found to have been unchanged. Host segment 19 then uses this record to synchronize the databases by comparing it to the records of host database 14. After synchronization, the remote and host history files and the databases are updated. Since the unchanged records which typically constitute most of the records of a database are not transferred to the host computer, a data transfer link, specially a slow data transfer link, is used with increased efficiency.

Other embodiments are within the following claims.

What is claimed is:

1. A computer implemented method of synchronizing a first and a second database, wherein the first database is resident on a first computer and is capable of providing change data reflecting whether the records of the database have been changed, added, or deleted since the previous synchronization, wherein the second database is resident on a second computer different from the first computer, and wherein a history file reflecting the contents of records of the databases at the time of a prior synchronization is used to perform the synchronization, the method comprising:

determining whether the records of the first database have been changed, added, or deleted since a previous synchronization, based on change data reflecting whether the records of the first database have been changed, added, or deleted since the previous synchronization, the change data comprising database generated data for keeping track of whether the records of the first database have been changed, added, or deleted since a previous synchronization;

transferring from the first computer to the second computer generally only the change data and the records of the first database that have been changed or added;

using the change data to determine which of the records of the first database have not been changed, added, or deleted since the previous synchronization;

using the result of that determination and the transferred records to reconstruct the content of the first database at the time of the previous synchronization;

performing a current synchronization using the reconstructed content of the first database, the history file containing records reflecting the contents of records of the databases at the time of the previous synchronization, and the second database changing, adding, or deleting the records of the first database based on the result of the current synchronization;

changing, adding, or deleting the records of the second database based on the result of the current synchronization; and changing, adding or deleting records in the history file using results of the current synchronization such that the history file contains records reflecting the contents of records of the first and second databases after the current synchronization.

2. The method of claim 1 wherein the records of the first and second databases are characterized respectively by first and second record structures, wherein the first record structure is different from the second record structure thereby making the first and second databases incompatible.

3. The computer implemented method of claim 2 wherein the change data indicates the most recent date and time of when the records were created or changed.

4. The computer implemented method of claim 2 wherein the change data comprises a flag set when the records are created or changed.

5. The computer implemented method of claim 2 wherein the first database provides further database generated data indicating which of the records were deleted since the previous synchronization, further comprising:

identifying records of the history file corresponding to the deleted records by performing a comparison of the further database generated data with the history file; and completing the current synchronization using a result of the identification.

6. A computer program, resident on a computer readable medium, for synchronizing a first and a second database, wherein the first database is resident on a first computer and is capable of providing change data reflecting whether the records of the database have been changed, added, or deleted since the previous synchronization, wherein the second database is resident on a second computer different from the first computer, and wherein a history file reflecting the contents of records of the databases at the time of a prior synchronization is used to perform the synchronization, comprising instructions for:

determining whether the records of the first database have been changed, added, or deleted since a previous synchronization, based on change data reflecting whether the records of the first database have been changed, added, or deleted since the previous synchronization, the change data comprising database generated data for keeping track of whether the records of the first database have been changed, added, or deleted since a previous synchronization;

transferring from the first computer to the second computer generally only the change data and the records of the first database that have been changed or added;

using the change data to determine which of the records of the first database have not been changed, added, or deleted since the previous synchronization;

using the result of that determination and the transferred records to reconstruct the content of the first database at the time of the previous synchronization;

performing a current synchronization using the reconstructed content of the first database, the history file containing records reflecting the contents of records of the databases at the time of the previous synchronization, and the second database changing, adding, or deleting the records of the first database based on the result of the current synchronization;

changing, adding, or deleting the records of the second database based on the result of the current synchronization; and changing, adding or deleting records in the history file using results of the current synchronization such that the history file contains records reflecting the contents of records of the first and second databases after the current synchronization.

7. The computer program of claim 6 wherein the records of the first and second databases are charcterized respectively by first and second record structures, wherein the structure thereby making the first and second databases incompatible.

8. The computer program of claim 6 wherein the change data indicates the most recent date and time of when the records were created or changed.

9. The computer program of claim 6 wherein the chance data comprises a flag set when the recorda are created or changed.

10. The computer program of claim 6 wherein the first database provides further database generated data indicating which of the records were deleted since the previous synchronization, further comprising instructions for:

identifying records of the history file corresponding to the deleted records by performing a comparison of the further database generated data with the history file; and completing the current synchronization using a result of the identification.

* * * * *

UNITED STATES PATENT AND TRADEMARK OFFICE
CERTIFICATE OF CORRECTION

PATENT NO.    : 6,330,568 B1                                              Page 1 of 1
DATED         : December 11, 2001
INVENTOR(S)   : David J. Boothby, Robert C. Daley and John R. Marien It is certified that error appears in the above-identified patent and that said Letters Patent is hereby corrected as shown below:

Drawings,
FIG. 3, line 3 of "104.", "rewritting" should be -- rewriting --.
FIG. 3, line 3 at "105.", "them" should be -- then --.
FIG. 4, line 1 of "1059.", delete the second occurrence of "a".

Column 6,
Line 45, "B Translator" should be -- B_Translator --.
Line 53, "B Sanitizer" should be -- B_Sanitizer --.

Column 7,
Line 54, the second occurrence of "the" should be -- to --.

Column 13,
Line 37, "computer" should be -- computers --.

Column 15,
Line 14, "claim 2" should be -- claim 1 --.
Line 17, "claim 2" should be -- claim 1 --.
Line 20, "claim 2" should be -- claim 1 --.

Column 16,
Line 28, after "the", insert -- first record --, and
Line 29, after "structure", insert -- is different from the second record structure --.
Line 35, "recorda" should be -- records --.

Signed and Sealed this

Fifth Day of November, 2002

Attest:

Attesting Officer

JAMES E. ROGAN
Director of the United States Patent and Trademark Office